US006407155B1

(12) United States Patent
Qian et al.

(10) Patent No.: US 6,407,155 B1
(45) Date of Patent: *Jun. 18, 2002

(54) INTERCALATES FORMED VIA COUPLING AGENT-REACTION AND ONIUM ION-INTERCALATION PRE-TREATMENT OF LAYERED MATERIAL FOR POLYMER INTERCALATION (75) Inventors: Guoqiang Qian, Wheeling; Tie Lan, Lake Zurich; Aaron M. Fay, Island Lake, all of IL (US); Anthony S. Tomlin, Fife (GB)

(73) Assignee: Amcol International Corporation, Arlington Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,136

(22) Filed: Mar. 1, 2000

(51) Int. Cl.$^7$ .................................................. C08K 3/34
(52) U.S. Cl. ....................... 524/445; 523/215; 523/216; 524/445; 524/446; 524/447; 524/412; 524/528
(58) Field of Search ................................ 523/215, 216; 524/262, 445, 446, 447, 492, 504, 528, 186; 525/285, 301

(56) References Cited

U.S. PATENT DOCUMENTS

| 2,035,546 | A | 3/1936 | Hamilton ..................... 167/24 |
|---|---|---|---|
| 3,419,460 | A | 12/1968 | Ure ............................ 161/162 |
| 3,419,517 | A | 12/1968 | Hedrick et al. ............... 260/37 |
| 3,515,626 | A | 6/1970 | Duffield ...................... 161/162 |
| 3,773,708 | A | 11/1973 | Takahashi et al. ......... 260/41 R |
| 3,795,650 | A | 3/1974 | Burns .................... 260/33.4 R |
| 3,912,532 | A | 10/1975 | Simone ................. 106/308 N |
| 3,929,678 | A | 12/1975 | Laughlin et al. ............ 252/526 |
| 3,929,849 | A | 12/1975 | Oswald ....................... 260/448 |
| 4,053,493 | A | 10/1977 | Oswald ....................... 260/448 |
| 4,125,411 | A | 11/1978 | Lyons ........................ 106/244 |
| 4,136,103 | A | 1/1979 | Oswald ....................... 260/448 |
| 4,210,572 | A | 7/1980 | Herman et al. ............. 260/404 |
| 4,251,576 | A | 2/1981 | Osborn et al. .............. 428/331 |
| 4,400,485 | A | 8/1983 | Mukamal et al. ........... 524/444 |
| 4,431,755 | A | 2/1984 | Weber et al. ............... 523/203 |
| 4,434,075 | A | 2/1984 | Mardis et al. ........... 252/315.2 |
| 4,472,538 | A | 9/1984 | Kamigaito et al. ......... 523/202 |
| 4,500,670 | A | 2/1985 | McKinley et al. .......... 524/445 |
| 4,546,126 | A | 10/1985 | Breitenfellner et al. ..... 523/216 |
| 4,546,145 | A | 10/1985 | Kishida et al. ............. 524/780 |
| 4,600,744 | A | 7/1986 | Libor et al. ................. 524/446 |
| 4,613,542 | A | 9/1986 | Alexander .................. 428/290 |
| 4,624,982 | A | 11/1986 | Alexander .................. 524/446 |
| 4,676,929 | A | 6/1987 | Rittler .................... 252/315.2 |
| 4,739,007 | A | 4/1988 | Okada et al. ............... 524/789 |
| 4,777,206 | A | 10/1988 | Rittler ........................ 524/445 |
| 4,789,403 | A | 12/1988 | Rice ........................... 106/417 |
| 4,798,766 | A | 1/1989 | Rice ........................... 428/404 |
| 4,810,734 | A | 3/1989 | Kawasumi et al. ......... 523/216 |
| 4,842,651 | A | 6/1989 | Ravet et al. ................ 106/487 |
| 4,849,006 | A | 7/1989 | Knudson, Jr. .............. 71/64.11 |
| 4,851,021 | A | 7/1989 | Bohrn et al. .................... 65/17 |
| 4,874,728 | A | 10/1989 | Eilliott et al. ............... 501/148 |
| 4,875,762 | A | 10/1989 | Kato et al. .................. 350/357 |
| 4,889,885 | A | 12/1989 | Usuki et al. ................. 524/443 |
| 4,894,411 | A | 1/1990 | Okada et al. ............... 524/710 |
| 4,920,171 | A | 4/1990 | Hutton, Jr. et al. ......... 524/446 |
| 4,956,121 | A | 9/1990 | Tymon et al. .......... 252/378 R |
| 5,028,351 | A | 7/1991 | Kato et al. .............. 252/315.2 |
| 5,032,546 | A | 7/1991 | Giannelis et al. .............. 501/3 |
| 5,032,547 | A | 7/1991 | Giannelis et al. .............. 501/3 |

(List continued on next page.)

FOREIGN PATENT DOCUMENTS

| CA | 2209671 | 1/1998 |
|---|---|---|
| DE | 1 642 122 | 7/1970 |
| DE | 281 585 A5 | 8/1990 |
| EP | 0 205 281 A3 | 12/1986 |
| EP | 0 335 653 A1 | 10/1989 |
| EP | 0 358 415 A1 | 3/1990 |
| EP | 0 479 031 A1 | 4/1992 |
| EP | 0 548 940 A1 | 6/1993 |
| EP | 0 619 182 A1 | 10/1994 |
| EP | 0 645 181 A2 | 3/1995 |
| EP | 0 747 451 A2 | 12/1996 |
| EP | 0 761 739 A1 | 3/1997 |
| EP | 0 780 340 A1 | 6/1997 |
| EP | 807659 A1 * | 11/1997 |
| EP | 0 818 508 A2 | 1/1998 |
| EP | 1055706 A1 * | 11/2000 |
| GB | 1 146 668 | 3/1969 |
| GB | 1 565 362 | 4/1980 |
| GB | 2 088 932 A | 6/1982 |
| WO | WO 93/04117 | 3/1993 |
| WO | WO 93/04118 | 3/1993 |
| WO | WO 93/11190 | 6/1993 |
| WO | WO 96/08526 | 3/1996 |
| WO | WO 98/01346 | 1/1998 |

OTHER PUBLICATIONS

Kurokawa, Y; Yasuda, H; Oya, A. "Preparation of Nanocomposite of Polypropylene and Smectite" Journal of Materials Science Letters 15 (1996) 1481–1483.*

(List continued on next page.)

Primary Examiner—Edward J. Cain
(74) Attorney, Agent, or Firm—Marshall, Gerstein & Borun (57) ABSTRACT Intercalated layered materials prepared by reacting the layered material with a coupling agent and co-intercalating an onium ion and an oligomer or polymer between the planar layers of a swellable layered material, such as a phyllosilicate, preferably a smectite clay. The spacing of adjacent layers of the layered materials is expanded at least about 3 Å, preferably at least about 5 Å, usually preferably to a d-spacing of about 15–20 Å, e.g., 18 Å with the onium ion spacing/compatibilizing agent. The intercalation of the oligomer or polymer then increases the spacing of adjacent layers an additional at least 3 Å, e.g., to at least about 20 Å, preferably about 25 Å to about 30 Å, generally about 28 Å, and provides a nanocomposite having increased tensile strength, flexibility, and ductility (less brittle).

41 Claims, 1 Drawing Sheet

U.S. PATENT DOCUMENTS

| | | | |
|---|---|---|---|
| 5,091,462 A | 2/1992 | Fukui et al. | 524/504 |
| 5,102,948 A | 4/1992 | Deguchi et al. | 524/789 |
| 5,164,440 A | 11/1992 | Deguchi et al. | 524/444 |
| 5,164,460 A | 11/1992 | Yano et al. | 624/445 |
| 5,204,078 A | 4/1993 | Tateyama et al. | 423/331 |
| 5,206,284 A | 4/1993 | Fukui et al. | 524/504 |
| 5,229,451 A | 7/1993 | Carter et al. | 524/493 |
| 5,248,720 A | 9/1993 | Deguchi et al. | 524/444 |
| 5,326,500 A | 7/1994 | Friedman et al. | 252/378 |
| 5,340,558 A | 8/1994 | Friedman et al. | 423/328.1 |
| 5,385,776 A | 1/1995 | Maxfield et al. | 428/297 |
| 5,391,437 A | 2/1995 | Miyasaka et al. | 528/425.5 |
| 5,414,042 A | 5/1995 | Yasue et al. | 524/789 |
| 5,428,094 A | 6/1995 | Tokoh et al. | 524/379 |
| 5,506,046 A | 4/1996 | Andersen et al. | 524/446 |
| 5,508,072 A | 4/1996 | Andersen et al. | 524/446 |
| 5,514,734 A | 5/1996 | Maxfield et al. | 523/204 |
| 5,552,469 A | 9/1996 | Beall et al. | 524/445 |
| 5,554,670 A | 9/1996 | Giannelis et al. | 523/209 |
| 5,571,851 A | 11/1996 | Freeman et al. | 523/212 |
| 5,578,672 A | 11/1996 | Beall et al. | 624/446 |
| 5,659,034 A | 8/1997 | Debord et al. | 546/2 |
| 5,667,886 A | 9/1997 | Gough et al. | 428/331 |
| 5,698,624 A | 12/1997 | Beall et al. | 524/445 |
| 5,721,306 A | 2/1998 | Tsipursky et al. | 524/449 |
| 5,730,996 A | 3/1998 | Beall et al. | 424/405 |
| 5,747,403 A | 5/1998 | Boyd et al. | 502/62 |
| 5,747,560 A | 5/1998 | Christiani et al | 523/209 |
| 5,760,106 A | 6/1998 | Pinnavaia et al. | 523/209 |
| 5,760,121 A | 6/1998 | Beall et al. | 524/450 |
| 5,766,751 A | 6/1998 | Kotani et al. | 428/323 |
| 5,801,216 A | 9/1998 | Pinnavaia et al. | 523/209 |
| 5,804,613 A | 9/1998 | Beall et al. | 523/200 |
| 5,824,226 A | 10/1998 | Boyd et al. | 210/679 |
| 5,830,528 A | 11/1998 | Beall et al. | 427/220 |
| 5,837,763 A | 11/1998 | Ferraro et al. | 524/449 |
| 5,844,032 A | 12/1998 | Serrano et al. | 524/445 |
| 5,849,830 A | 12/1998 | Tsipursky et al. | 524/450 |
| 5,853,886 A | 12/1998 | Pinnavaia et al. | 428/403 |
| 5,871,846 A | 2/1999 | Freeman et al. | 428/405 |
| 5,877,248 A | 3/1999 | Beall et al. | 524/450 |
| 5,880,197 A | 3/1999 | Beall et al. | 524/445 |
| 5,910,523 A | 6/1999 | Hudson | 523/213 |
| 5,952,095 A | 9/1999 | Beall, et al. | 428/332 |
| 5,955,094 A | 9/1999 | Beall et al. | 424/405 |
| 5,981,029 A | 11/1999 | Harada et al. | 428/143 |
| 5,994,445 A | 11/1999 | Kaschel et al. | 524/444 |
| 5,998,528 A | 12/1999 | Tsipursky et al. | 524/445 |
| 6,034,163 A | 3/2000 | Barbee et al. | 524/445 |
| 6,050,509 A | 4/2000 | Clarey et al. | 241/21 |
| 6,057,396 A | 5/2000 | Lan et al. | 524/445 |
| 6,071,988 A | 6/2000 | Barbee et al. | 523/210 |
| 6,083,559 A | 7/2000 | Beall et al. | 427/220 |
| 6,084,019 A | 7/2000 | Matayabas, Jr. et al. | 524/445 |
| 6,090,734 A | 7/2000 | Tsipursky et al. | 501/141 |
| 6,124,365 A | 9/2000 | Lan et al. | 516/101 |
| 6,126,734 A | 10/2000 | Beall et al. | 106/487 |
| 6,225,394 B1 * | 5/2001 | Lan et al. | 524/445 |

OTHER PUBLICATIONS

Usuki, A; Kato, M; Okada, A; Karauchi, T. "Synthesis of Polypropylene–Clay Hybrid" Journal of Applied Polymer Science, vol. 63, 137–139 (1997).*

Kawasumi, M; Hasegawa, N; Kato, M; Usuki, A; Okada, A "Preparation and Mechanical Properties of Polypropylene–Clay Hybrids" Macromlecules 1997, 30, 6333–6338.*

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties of Nylon 6–Clay Hybrid", J. Mater. Res., vol. 8, No. 5, May 1993, pp. 1185–1189.

K. Suzuki, et al., "Preparation of Delaminated Clay Having a Narrow Micropore Distribution in the Presence of Hydroxyaluminum Cations and Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption of Polyvinyl Alcohols by Montorillonite", Journal of Colloid Science, 18, (1963) pp. 647–664.

R. A. Vaia et al., "Synthesis and Properties of Two–Dimensional Nanostructures by Direct Intercalation of Polymer Melts in Layered Silicates", Chem. Mater. 1993, 5, pp. 1694–1696.

R. A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1924) 29, pp. 169–178.

C. E. Clapp et al., "Adsorption Studies of a Dextron on Montmorillonite", Trans. 9th Int. Cong. Soil Sci., 1968, vol. 1, pp. 627–634.

H. G. G. Dekking, "Preparation and Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G. W. Brindley, et al., "Preparation and Solvation Properties Of Some Variable Charge Montmorillonites", Clays and Clay Mineral, 1971, vol. 18, pp. 399–404.

A. Okada, et al., "A Solid State NMR Study on Crystalline Forms Of Nylon 6", Journal of Applied Polymer Science, (1989), vol. 37, pp. 1363–1371.

A. Usuki, et al., Swelling Behavior of Montmorillonite Cation Exchanged for ω–Amino Acids by ε–Caprolactam, J. Mater. Res., vol. 8, No. 5, May 1993, pp. 1174–1178.

Y. Kojima, et al., "One–Pot Synthesis of Nylon 6–Clay Hybrid", Journal of Polymer Science: Part A: Polymer Chemistry, vol. 31, (1993), pp. 1775–1758.

Y. Kojima, et al., "Fine Structure of Nylon–6–Clay Hybrid", Journal of Polymer Science: Part B: Polymer Physics, vol. 32 (1994), pp. 625–630.

B. K. G. Theng, "Clay–Polymer interactions: SumGomary and Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan,* International Edition, vol. 100, No. 4, Apr. 1, 1992, pp. 420–423.

Ogawa, et al., "Preparation of Montmorillonite–Polyacrylamide Intercalation Compounds and the Water Absorbing Property", *Clay Science,* vol. 7, 1989 Tokyo, Japan, pp. 243–251.

Wu, et al., "Structural, thermal and electrical characterization of layered nanocomposites derived from sodium–montmorillonite and polyethers", *Chemical Abstracts,* vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Synthesis and Properties of Polymide–Clay Hybrid", Polymer Preprints, ACS, Apr. 1991, pp. 65–66.

Giannelis, et al., "Synthesis and Processing of Ceramics: Scientific Issues", Materials Research Society Symposium Proceedings, vol. 249 (1992), pp. 547–558.

Sanchez Camazano, M. et al., "Factors influencing interactions of organophosphorus pesticides with montmorillonite", *Chemical Abstracts,* vol. 98, No. 19, May 9, 1983, Columbus, Ohio, US, Abstract No. 156367.

T. Lan, et al., "Clay–Epoxy Nanocomposites:Relationships Between Reinforcement Properties and the Extent of Clay Layer Exfoliation", *Polym. Mater. Sc. Eng.,* 73, pp. 296–297 (1995).

* cited by examiner

INTERCALATES FORMED VIA COUPLING AGENT-REACTION AND ONIUM ION-INTERCALATION PRE-TREATMENT OF LAYERED MATERIAL FOR POLYMER INTERCALATION

FIELD OF THE INVENTION

The present invention is directed to intercalated layered materials and, optionally, exfoliates thereof, prepared by contacting, and thereby reacting, a layered material, e.g., a phyllosilicate, such as a smectite clay, with a coupling agent, such as a silane coupling agent, to replace platelet edge —OH groups with —O—Si—R groups; intercalation of an onium ion spacing/compatibilizing agent and co-intercalation of the layered material with an oligomer or polymer, particularly a non-polar polymer, (e.g., as a polyolefin polymer, oligomer or copolymer) for ease of polymer intercalation. The polymer can be intercalated in the form of a polymer or oligomer capable of polymerization to form the polymer, (e.g., an ethylene oligomer or polymer and/or a propylene oligomer or polymer and/or copolymers thereof) or, can be unexpectedly easily intercalated as the oligomer or polymer by direct compounding, e.g., by combining the coupling agent reacted and onium ion-intercalated layered material and the oligomer and/or polymer in a mixing or extruding device preferably at or above the polymer melt temperature, to produce the co-intercalated layered material and the nanocomposite.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for intercalation of the polymer between the layers, thereby substantially increasing the interlayer (interlaminar) spacing between the adjacent silicate layers. The thus-treated, intercalated phyllosilicates, having interlayer spacings increased by at least 3 Å, preferably at least 5 Å, e.g., to an interlayer (interlaminar) spacing of at least about 10–25 Å and up to about 100 Angstroms, then can be exfoliated, e.g., the silicate layers are separated, e.g., mechanically, by high shear mixing. The individual silicate layers, when admixed with a matrix polymer, e.g., a polyamide—see U.S. Pat. Nos. 4,739,007; 4,810,734; and 5,385,776—have been found to substantially improve one or more properties of the polymer, such as mechanical strength and/or high temperature characteristics.

Exemplary prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is reactive with the matrix polymer. Such quaternary ammonium cations are well known to convert a highly hydrophilic clay, such as sodium or calcium montmorillonite, into an organophilic clay capable of sorbing organic molecules.

Maxfield U.S. Pat. No. 5,514,734 ('734) discloses intercalation of clay with both a coupling agent (silane, titanate or zirconate) and onium ions together with in-situ polymerization of a nylon polymer precursor, such as polymerizable nylon monomers, e.g., ε-caprolactam, capable of in-situ polymerization to form a polymer that is reactive with the coupling agent to tether the polymer to the clay platelets. In accordance with the present invention, a coupling agent-reacted and onium compound-intercalated layered silicate material, hereinafter "CAO Material", is polymer melt processed for unexpectedly better dispersibility of the exfoliated platelets throughout a matrix polymer, particularly non-polar matrix polymers, such as polyolefins, especially polypropylene. In accordance with the present invention, the coupling agent preferably is not reactive with the matrix polymer, so that the matrix polymer is not tethered to the clay platelets. The Maxfield '734 patent is hereby incorporated by reference for its disclosure of coupling agents useful in accordance with the present invention.

Coupling Agent Reaction

Edges of clay layered materials are replete with hydroxy groups (—OH) that make it extremely difficult to intercalate non-polar and low polarity oligomers and polymers. In accordance with an important feature of the present invention, it has been found that by reacting the —OH groups at the edges of clay platelets with a coupling agent, to form coupling agent covalent bonds at the clay edges, the clay becomes much more receptive to intercalation of such non-polar and low polarity oligomers and polymers, such as ethylene and propylene homopolymers and copolymers.

Useful coupling agents include those selected from the group consisting of silanes, titanates, aluminates, zirconates, and mixtures thereof; particularly the organosilanes, organotitanates, organoaluminates and/or organozirconates. The coupling agent(s) can be reacted with the —OH functionalities at the edges of the layered material platelets by contacting the layered material, before, during, or after onium ion intercalation, with the coupling agents, in the form of a gas, neat liquid, finely divided (e.g., non-colloidal) solid, or solute in a solvent. The concentration of coupling agent should be at least about 0.1%, preferably in the range of about 0.1% to about 10% by weight, more preferably in the range of about 0.5% to about 6% by weight, and most preferably about 1% to about 4% by weight, based on the dry weight of the layered material. The coupling agents have a structure as follows:

wherein $x$ = Si, Ti, Zr or Al wherein $R_1$ is an organic radical, preferably an alkyl radical or an amine radical, bonded directly to the Si, Ti, Zr or Al atom (x) and at least one of $R_2$, $R_3$ and $R_4$ is a radical containing a functionality, preferably an organic functionality, capable of a condensation reaction with a hydrogen from the —OH groups at the edges of the layered material, preferably selected from H, halogen, alkoxy, acyloxy and amine.

The —OH reaction of the coupling agent, e.g., silane, can be accomplished by either adding the silane to a dry onium-intercalated clay, i.e., organoclay, or by adding the silane to a water slurry of the organoclay, followed by removal of by-products and solvent during heat treatment.

Alternatively, the silane also be added to the polymer-organoclay nanocomposite by integral blend methods. In this method, undiluted silane is added to the polymer either before or after introduction of the onium-intercalated clay or organoclay. It is preferable to add the silane before introduction of the clay because this allows for better dispersion and distribution of the silane into the polymer.

In addition to platelet edge —OH reaction with a coupling agent, the layered material also is intercalated with onium ions, e.g., ammonium ions, having a general structure of:

Where $R_1$, is a $C_2$–$C_{22}$ alkyl chain, straight chain or branched, and $R_2$, $R_3$ and $R_4$, same or different, are hydrogen or an alkyl aryl or alkyl moiety, preferably a $C_1$–$C_8$ alkyl chain.

Where the intercalant polymer is a polyolefin, in accordance with the preferred embodiment, it is preferred to add 0.2% to 10% modified polyolefin, e.g., maleic anhydride-modified polyolefin, based on the total weight of the polymer, including intercalated polymer and matrix polymer, to increase the interaction between polyolefin and the silane-reacted, onium ion-intercalated layered material. The new silane-reacted, onium ion-intercalated (CAO Material) and polyolefin-intercalated organoclay nanocomposite has improved mechanical properties and heat stability over traditional polyolefin-organoclay nanocomposites, it is theorized due to the silane reaction enabling easier and more complete intercalation of the non-polar polymer between clay platelets for surprisingly better dispersibility of clay platelets and fewer, thinner tactoids.

Onium Ion Intercalation

The interlaminar spacing of adjacent layers (platelets) of the coupling agent-reacted layered material is expanded at least about 3 Å, preferably at least about 5 Å, to a basal spacing of at least about 10 Å, preferably to at least about 15 Å, and usually to about 18 Å by contacting the layered material with the onium ion spacing/compatibilizing agent for subsequent intercalation with an oligomer or polymer. The onium ion may be primary, secondary, tertiary or quaternary and preferably is a long chain ($C_6$+) onium ion spacing/compatibilizing agent having at least one binding (ion-exchange) site capable of ion-exchanging or replacing $Li^+$, $Na^+$, $K^+$, $Ca^+$, $Mg^{+2}$, or other inorganic cations that occur within the interlayer spaces between adjacent layers or platelets of the layered materials. The association of the layered material inorganic cations with the onium ion spacing/compatibilizing agent via ion-exchange enables the conversion of the hydrophilic interior clay platelet surfaces to hydrophobic platelet surfaces. Therefore, oligomers or polymers can be easily intercalated between adjacent platelets of the layered material, e.g., smectite clay platelets.

In accordance with the preferred embodiment of the present invention, a fully polymerized polymer, preferably a non-polar polymer such as polyethylene, polypropylene or copolymers thereof, having a weight average molecular weight between about 100 and about 5 million, preferably about 1,000 to about 500,000, is intercalated between adjacent platelets of the coupling agent-reacted and onium ion-intercalated layered material (CAO Material), preferably simultaneously with dispersing the intercalate into a matrix polymer, i.e., by direct compounding of the coupling agent-reacted and onium ion-intercalated layered material with the polymer. The pretreatment or reaction of the layered material edges with the coupling agent, and the intercalation of the onium ions (CAO Material) and intercalation of oligomers or polymers, results in a completely homogeneous dispersion of intercalated layered material and/or exfoliated platelets.

Optionally, the nanocomposite material can be sheared to exfoliate up to 100% of the tactoids or platelet clusters into individual platelets, preferably such that more than 80%; or more than 90% by weight of the layered material can be completely exfoliated into single platelet layers. Quick, easy, and completely homogeneous dispersion of the spacing/compatibilizing agent-reacted, onium ion/polymer co-intercalated layered material in a matrix polymer is achieved and the resulting nanocomposite has unexpectedly easy polymer intercalation and homogeneous dispersion of the intercalate and/or exfoliate throughout the matrix polymer.

The intercalates of the present invention can be dispersed uniformly into any matrix polymer to form a polymer/clay intercalate or polymer/clay exfoliate by direct compounding of the coupling agent-reacted and onium ion-intercalated clay with sufficient oligomer or polymer intercalant for intercalation of the clay to form a polymer intercalated clay, as a concentrate, that can later be mixed with additional matrix polymer to form a nanocomposite.

In accordance with an important feature of the present invention, if an intercalant oligomer or polymer is intercalated into the coupling agent-reacted and onium ion-intercalated clay galleries, the intercalate can be directly compounded with the pristine matrix polymer, preferably the same as the polymer intercalant, to form a nanocomposite easily, while achieving a nanocomposite material with homogeneously dispersed platelets, essentially free of tactoids.

In accordance with one embodiment of the present invention, intercalates are prepared by contacting a phyllosilicate with a monomeric onium ion spacing/compatibilizing agent compound. To achieve the full advantage of the present invention, the onium ion should include at least one long chain radical ($C_6$+) that may be aliphatic, straight or branched chain, or aralkyl. Exemplary of such suitable $C_6$+ onium ion molecules include primary, secondary, tertiary or quaternary ammonium ions, sulfonium ions, phosphonium ions, oxonium ions, or any ion of an element in Groups V or VI of the periodic table of elements.

In accordance with an important feature of the present invention, best results are achieved by mixing the layered material with the onium ions, e.g., $C_6$+onium ion spacing coupling agent-reacted, in a concentration of at least about 2% by weight, preferably at least about 5% by weight onium ion compound, more preferably at least about 10% by weight onium ion compound, and most preferably about 20% to about 50% by weight, based on the weight of onium ion compound and carrier (e.g., water, with or without an organic solvent for the onium ion compound) to achieve better sorption of the onium ion spacing/compatibilizing agent compound between the platelets of the layered material. Regardless of the concentration of onium ion compound in the onium ion intercalating composition, the weight ratio of oligomer or polymer intercalant:layered material should be at least 1:20, preferably at least 1:10, more preferably at least 1:5, and most preferably about 1:4 to achieve sufficient oligomer or polymer intercalation between adjacent inner surfaces of adjacent platelets of the layered material. The onium ion spacing/compatibilizing agent compound ion-exchanged with and bonded to (or complexed with) the alumino silicate platelets via ion-exchange causes surprisingly easy intercalation of the oligomer or polymer.

In accordance with an important feature of the present invention, it has been found that a coupling agent-reacted and onium ion-intercalated layered material, e.g. a phyllosilicate, such as a smectite clay, can be easily co-intercalated with an oligomer or polymer, even low polarity and non-polar polymers, to form an onium ion/polymer co-intercalate that has excellent intercalate dispersibility in a matrix polymer, particularly a non-polar matrix polymer. The intercalate also can be added to any other matrix polymer to enhance a number of properties of the matrix polymer, improving tensile properties, dimensional stability, ductility, gas-impermeability, elongation, and the like.

The coupling agent treatment, onium ion/polymer co-intercalating process of the present invention provides an intercalate that can be added, particularly by direct compounding (mixing the intercalate directly into a matrix polymer melt) of the intercalate with any matrix polymer, e.g., all market available resin systems, particularly non-polar polymers.

Definitions

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes an onium ion spacing/compatibilizing agent disposed between adjacent platelets of the Layered Material to increase the interlayer spacing between the adjacent platelets at least 3 Å, preferably at least 5 Å, to an interlayer spacing, for example, of at least about 10 Å, preferably at least about 15 Å, e.g., 18 Å; the Layered Material has been reacted at some of the —OH functionalities, at the platelet edges, with a coupling agent; and co-intercalated with an oligomer or polymer co-intercalant, to increase the d-spacing to at least about 20 Å, preferably to 25 Å to 35 Å.

"Coupling Agent-Treated or "Coupling Agent-Treatment" or "Coupling Agent-Reacted" shall mean the contact of a layered material with a coupling agent, e.g., a silane coupling agent, a titanate coupling agent, a zirconate coupling agent and/or an aluminate coupling agent to produce a condensation reaction between the coupling agent and —OH radicals at the edges of the platelets of the Layered Material.

"Intercalation" shall mean a process for forming an Intercalate.

"Onium Ion Spacing/compatibilizing agent" or "Onium Ion Compound" shall mean an organic compound that includes a positively charged atom selected from the group consisting of a nitrogen atom, a phosphorous atom, a sulftir atom or an oxygen atom, preferably a quaternary ammonium compound, and when dissolved in water and/or an organic solvent, an anion dissociates from the onium ion spacing/compatibilizing agent leaving an onium cation that can ion-exchange with a silicate platelet exchangeable cation, e.g., $Na^+$, $Ca^{+2}$, $Li^+$, $Mg^{+2}$, or $K^+$, thereby binding to the silicate platelet inner surface.

"Co-Intercalation" shall mean a process for forming an intercalate by intercalation of an onium ion spacing/compatibilizing agent and, at the same time or separately, intercalation of a polymer, or intercalation of an oligomer.

"Concentrate" shall mean an intercalate or exfoliate, formed by the Coupling Agent Treatment and Co-Intercalation of a Layered Material to form a concentrate comprising 10–90% oligomer or polymer (same as or different than the matrix polymer) and 10–90% Intercalate.

"Intercalating Carrier" shall mean a carrier comprising water and/or an organic solvent used with the onium ion spacing/compatibilizing agent and/or with the intercalant oligomer or polymer to form an Intercalating Composition capable of achieving Intercalation of the onium ion spacing/compatibilizing agent and, at the same time or separately, intercalation of the oligomer or polymer between platelets of the Layered Material.

Intercalating Composition" or "Intercalant Composition" shall mean a composition comprising a Layered Material together with an onium ion spacing/compatibilizing agent and/or an oligomer or polymer, with or without an Intercalating Carrier.

"Exfoliate" or "Exfoliated" shall mean individual platelets of a Coupling Agent-Treated, Co-Intercalated Layered Material or tactoids or clusters of individual platelets, e.g., 2–10 platelets, preferably 2–5 platelets, that are smaller in total thickness than the non-exfoliated. Layered Material, dispersed as individual platelets or tactoids throughout a carrier material, such as water, a polymer, an alcohol or glycol, or any other organic solvent, or throughout a matrix polymer.

"Exfoliation" shall mean a process for forming an Exfoliate from an Intercalate.

"Matrix Polymer" shall mean a thermoplastic or thermosetting polymer that the Intercalate or Exfoliate is dispersed within to improve the mechanical strength, thermal resistance, and/or the gas ($O_2$) impermeability of the Matrix Polymer, preferably a non-polar polymer, such as a polyolefin homopolymer or polyolefin copolymer.

"CAO Material" shall mean a Layered Material that has been Coupling Agent-Reacted at a portion of the —OH groups and Onium Ion-Intercalated.

SUMMARY OF THE INVENTION

In brief, the present invention is directed to intercalated layered materials prepared by coupling agent reaction and co-intercalation of an onium ion spacing/compatibilizing agent (CAO Material) and co-intercalated with an oligomer or polymer between the planar layers of a swellable layered material, such as a phyllosilicate, preferably a smectite clay. The spacing of adjacent layers of the layered materials is expanded at least about 3 Å, preferably at least about 5 Å, to at least about 10 Å, preferably to at least about 15 Å, usually to about 15–30 Å, e.g., 18 Å with the onium ion spacing/compatibilizing agent. The intercalation of the oligomer or polymer then increases the d-spacing of adjacent layers to at least about 20 Å, preferably about 25 Å to about 35 Å, generally about 28 Å.

The present invention is directed to a method of preparing intercalated layered materials, prepared by coupling agent reaction of a layered material and co-intercalation of an onium ion spacing/compatibilizing agent (preparing CAO Material) and co-intercalation of the CAO Material with an oligomer or polymer into the galleries of the layered materials to form intercalates or intercalate concentrate compositions that provide new and unexpected dispersability throughout a matrix polymer, particularly a non-polar matrix polymer.

The present invention also is directed to the intercalates and exfoliates prepared from the intercalate or intercalate concentrate compositions. The exfoliates can be prepared by adding the concentrate to a matrix oligomer or matrix polymer, or adding the oligomer or polymer intercalant(s), e.g. polypropylene, to further process the composition, such as by the addition of matrix polymer and/or extrusion and compounding the polymer with the intercalate or exfoliate thereof. The presence of the intercalated oligomer or polymer in the galleries of the layered materials makes the layered materials compatible to the preferred parent matrix oligomer or polymer combination of a polyolefin and a maleic anhydride-modified polyolefin when the intercalate is added to a melt of matrix oligomers or polymers that are the same as the oligomer(s) or polymer(s) intercalated. Therefore, for example, when mixed with more matrix oligomer or matrix polymer (preferably the same polymer as the intercalant polymer), the layered materials are unexpectedly more ready to be dispersed or exfoliated in the matrix polymer. The exfoliated individual layers and tactoids of the layered materials will perform as a polymer reinforcement and molecule (gas) barrier in a matrix polymer to improve the mechanical properties and barrier properties, e.g., gas impermeability, strength and temperature resistance of the matrix polymer. The exfoliate also can be prepared by directly adding a curing agent to the oligomer/or polymer/intercalated concentrate. The curing agent will penetrate into the gallery region of the intercalate to react with the polymerizable oligomers or polymers previously intercalated in the interlayer gallery and form uniformly dispersed platelets or a multi-layer intercalate in the resulting nanocomposite.

The coupling agent-reacted and onium ion intercalated layered material (CAO Material) is intercalated by contact with the melted polyolefin and maleic anhydride-modified polyolefin oligomer or polymer intercalants, such as by direct compounding the melt in an extruder, to intercalate the CAO Material with melted oligomer or polymer intercalants between adjacent phyllosilicate platelets and optionally separate (exfoliate) the layered material into individual platelets.

Addition of the coupling agent-reacted onium ion intercalated layered silicate (CAO Material) to a matrix oligomer or matrix polymer melt enhances one or more properties, such as strength, temperature deformation, resistance, solvent resistance, dimensional stability, ductility and/or gas impermeability. The intercalate is easily, homogeneously and uniformly dispersed throughout the matrix polymer and provides new and unexpected strength properties to non-polar matrix polymers by virtue of the unexpectedly homogeneous dispersability of the intercalate and/or exfoliates throughout a matrix polymer.

DETAILED DESCRIPTION OF THE PREFERRED EMBODIMENTS

To form the coupling agent-reacted, co-intercalated and exfoliated materials of the present invention, the layered material, e.g., the phyllosilicate should be reacted at its platelet edges with an —OH reactive coupling agent and swelled or intercalated by ion-exchange with an onium ion spacing/compatibilizing agent and, simultaneously or subsequently, intercalation of an oligomer or polymer, preferably a non-polar oligomer or polymer.

While the invention described herein is disclosed by way of the preferred embodiment via expanding the interlaminar spacing between adjacent platelets of a layered silicate material, e.g., a phyllosilicate, by a first treatment with a coupling agent followed by intercalating onium ions between the silicate platelets, to form the CAO Material, prior to or simultaneously with intercalating an oligomer or polymer intercalant, it should be understood that onium ion intercalation can be sequenced prior to the coupling agent reaction. Further it should be understood, in accordance with another embodiment of the present invention that the oligomer or polymer intercalant can be intercalated between and complexed to the internal platelet faces by other well known mechanisms, such as the dipole/dipole (direct intercalation of the oligomer or polymer) method disclosed in this Assignee's U.S. Pat. Nos. 5,880,197 and 5,877,248, (after coupling agent treatment) hereby incorporated by reference; and by the acidification technique (after coupling agent reaction), by substitution with hydrogen (ion-exchanging the interlayer cations with hydrogen by use of an acid or ion-exchange resin) as disclosed in the Deguchi U.S. Pat. No. 5,102,948, and in the Pinnavaia, et al. U.S. Pat. No. 5,853,886, both patents hereby incorporated by reference.

The onium ion spacing/compatibilizing agent is introduced into the layered material galleries in the form of a solid or liquid composition (neat or aqueous, with or without an organic solvent, e.g., an aliphatic hydrocarbon, such as heptane to, if necessary, aid to dissolve the onium ion compound) having an onium ion spacing/compatibilizing agent concentration sufficient to provide a concentration of about 5% to about 10% by weight of the clay (90–95% water) and the onium ion compound is dissolved in the clay slurry water, preferably at a molar ratio of onium ions to exchangeable interlayer cations of at least about 0.5:1, more preferably at least about 1:1. The onium ion-intercalated clay then is separated from the water easily, since the clay is now hydrophobic, and dried in an oven to less than 5% water, preferably bone dry, before being compounded with the oligomer or polymer, for intercalation of the oligomer or polymer and homogeneous platelet dispersion. The onium ion spacing/compatibilizing agent compound can be added as a solid with the addition to the layered material onium ion compound blend of preferably at least about 20% water, more preferably at least about 30% water or more, based on the dry weight of layered material. Preferably about 30% to about 50% water, more preferably about 30% to about 40% water, based on the dry weight of the layered material, is included in the onium ion intercalating composition, so that less water is sorbed by the intercalate, thereby necessitating less drying energy after onium ion intercalation.

The onium ion spacing/compatibilizing agent cations intercalated via ion-exchange into the interlayer spaces between adjacent layered material platelets are primary, secondary, tertiary or quaternary onium ions having the following preferred structure:

wherein X=N, P, S, or O; and wherein $R_1$, $R_2$, $R_3$ and $R_4$ are H or organic moieties, such as linear or branched alkyl, aryl or aralkyl moieties having 1 to about 24 carbon atoms.

The more preferred $C_6$+onium ions are preferably quaternary ammonium ions having Formula 1, as follows:

Formula 1

Wherein $R_1$ is a long chain alkyl moiety ranging from $C_6$ to $C_{24}$, straight or branched chain, including mixtures of long chain moieties, i.e., $C_6$, $C_8$, $C_{10}$, $C_{12}$, $C_{14}$, $C_{16}$, $C_{18}$, $C_{20}$, $C_{22}$ and $C_{24}$, alone or in any combination; and $R_2$, $R_3$ and $R_4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation.

Additional useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

where $X^+$ and $Y^+$, same or different, are ammonium, sulfonium, phosphonium, or oxonium radicals such as and the like; R is an organic spacing, backbone radical, straight or branched, preferably having from 2 to 24, more preferably 3 to 10 carbon atoms, in a backbone organic spacing molecule covalently bonded at its ends to charged $N^+$, $P^+$, $S^+$ and/or $O^+$ cations and $R^1$ can be hydrogen, or an alkyl radical of 1 to 22 carbon atoms, linear or branched, preferably having at least 6 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsulfinyl, aryloxy, alkylsulfinyl, alkylsulfonyl, arylthio, arylsulfinyl, alkoxycarbonyl, arylsulfonyl, or alkylsilane. Examples of $R^1$ include non-existent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful R groups are alkylenes, such as methylene, ethylene, octylene, nonylene, tert-butylene, neopentylene, isopropylene, sec-butylene, dodecylene and the like; alkenylenes such as 1-propenylene, 1-butenylene, 1-pentenylene, 1-hexenylene, 1-heptenylene, 1-octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, p-methylphenylamino nonadecylene and the like; diarylaminoalkylenes, such as diphenylamino pentadecylene, p-nitrophenyl-p'-methylphenylamino octadecylene and the like; alkylarylaminoalkylenes, such as 2-phenyl-4-methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclo-octylene, cycloheptylene and the like; alkoxyalkylenes such as methoxy-methylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10-phenyldecylene and the like; alkylarylenes such as 3-decylphenylene, 4-octylphenylene, 4-nonylphenylene and the like; and polypropylene glycol and polyethylene glycol substituents such as ethylene, propylene, butylene, phenylene, benzylene, tolylene, p-styrylene, p-phenylmethylene, octylene, dodecylene, octadecylene, methoxy-ethylene, moieties of the formula —$C_3H_6COO$—, —$C_5H_{10}COO$—, —$C_7H_{10}COO$—, —$C_7H_{14}COO$—, —$C_9H_{18}COO$—, —$C_{11}H_{22}COO$—, —$C_{13}H_{26}COO$—, —$C_{15}H_{30}COO$—, and —$C_{17}H_{34}COO$— and —$C=C(CH_3)COOCH_2CH_2$—, and the like. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

The preferred multi-charged spacing/coupling agent compounds are multi-onium ion compounds that include at least two primary, secondary, tertiary or quaternary ammonium, phosphonium, sulfonium, and/or oxonium ions having Formula 2, as follows:

Formula 2 wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation. $Z^1$ and $Z^2$, same or different, may be non-existent, or may be any of the moieties described for $R_1$, $R_2$, $R_3$ or $R_4$. Also, one or both of $Z^1$ and $Z^2$ may include one or more positively charged atoms or onium ion molecules.

Any swellable layered material that contains —OH groups at the edges of the platelets and sufficiently ion-exchanges with the onium ion spacing/compatibilizing agent at the internal platelet faces to increase the interlayer spacing between adjacent phyllosilicate platelets at least about 3 Å, preferably at least about 5 Å, can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The preferred clay materials generally include interlayer cations such as $Na^+$, $Ca^{+2}$, $K^+$, $Mg^{+2}$, $NH_4^+$ and the like, including mixtures thereof, particularly $Na^+$.

The amount of onium ion spacing/compatibilizing agent intercalated into the swellable layered materials, in order that the intercalated layered material platelet surfaces sufficiently complex or bond via ion-exchange to the onium ion spacing/compatibilizing agent molecules such that the layered material may be sufficiently spaced for easy intercalation of an oligomer or polymer may vary substantially between about 2%, preferably at least about 10%, and up to about 80%, based on the dry weight of the layered material. In the preferred embodiments of the invention, amounts of onium ion employed, with respect to the dry weight of layered material being intercalated, will preferably range from about 8 grams of onium ion spacing/compatibilizing agent compound: 100 grams of layered material (dry basis), preferably at least about 10 grams of onium ion spacing/compatibilizing agent compound: 100 grams of layered material to about 80–90 grams onium ion spacing/compatibilizing agent compound: 100 grams of layered material. More preferred amounts are from about 20 grams of onium ion spacing/compatibilizing agent compound: 100 grams of layered material to about 60 grams of onium ion spacing/compatibilizing agent compound: 100 grams of layered material (dry basis).

The onium ions may be introduced into and ion-exchanged with the layered silicate platelet surface within the interlayer spaces of the layered material in a number of ways. In a preferred method of intercalating the onium ions between adjacent platelets of the layered material, the layered material is slurried in water, e.g., at 0.05–20% by weight layered material and 80–99.95% by weight water, and the onium ion compound is dissolved in the water in which the layered material is slurried. If necessary, the onium ion compound can be dissolved first in an organic solvent, e.g., propanol. The layered material then is separated from the slurry water and dried prior to compounding with a polymer for intercalation of the polymer and to form the nanocomposite material in a matrix polymer. The coupling agent may be reacted with the layered material, preferably in an amount of about 2–4% by weight, based on the weight of the layered material, before or after (or simultaneously with) the onium ion-exchange intercalation. Preferred reaction conditions (which may vary considerably) include a temperature of about 70–75° C., a pH of about 3–5, to completion of the reaction. The coupling agent reaction can be performed in a slurry media or dry blending conditions. These lower reaction temperatures are preferred to allow the coupling agent to react at edge hydroxy groups more homogenously over the entire layered material edges. In addition, the coupling agent may be introduced to the layered silicate in situ during the polymer melt compounding process. In a preferred method of intercalating the polymer, the coupling agent reacted and onium ion-treated layered material is intimately mixed with the polymer, e.g., by extrusion or pug milling, to form an intercalating composition comprising the coupling agent-reacted /onium ion-intercalated layered material and the intercalant polymer.

To achieve sufficient intercalation of the onium ions between adjacent platelets of the layered material, the coupling agent-treated layered material and onium ion intercalating composition contains at least about 5% by weight, preferably at least about 10% by weight onium ion compound, based on the dry weight of the coupling agent-treated layered material, so that the resulting onium ion-intercalated layered material has interior platelet surfaces that are sufficiently hydrophobic and sufficiently spaced for intercalation of the oligomer or polymer. The amount of the coupling agent should be at least 0.1% by weight, based on the dry weight of the layered material, preferably in the range of 0.5% to 60% by weight, based on the dry weight of the layered material. The onium ion carrier (preferably water, with or without an organic solvent) can be added by first solubilizing or dispersing the onium ion compound in the carrier; or a dry onium ion compound and relatively dry coupling agent-treated phyllosilicate (preferably containing at least about 4% by weight water) can be blended and the intercalating carrier added to the blend, or to the phyllosilicate prior to adding the dry onium ion. When intercalating the phyllosilicate with onium ions in slurry form (e.g., 900 pounds water, 100 pounds phyllosilicate, 100 pounds onium ion compound), the amount of water can vary substantially, e.g., from about 4% by weight, preferably from a minimum of at least about 30% by weight water, with no upper limit to the amount of water in the intercalating composition (the phyllosilicate intercalate is easily separated from the intercalating composition due to its hydrophobicity after onium ion treatment).

Alternatively, the onium ion intercalating carrier, e.g., water, with or without an organic solvent, can be added directly to the coupling agent-treated phyllosilicate prior to adding the onium ion compound, either dry or in solution. Ion-exchange of the onium ion compound molecules may be performed by exposing the coupling agent-treated layered material to a dry or liquid onium ion compound in the onium ion intercalating composition containing at least about 2% by weight, preferably at least about 5% by weight onium ion compound, more preferably at least about 10% onium ion compound, based on the dry weight of the layered material.

In accordance with another method of intercalating the onium ions and oligomer and polymer between the platelets of the coupling agent-reacted layered material, the layered material, preferably containing at least about 4% by weight water, more preferably about 10% to about 15% by weight water, is blended with water and/or organic solvent solution of an onium ion spacing/compatibilizing agent compound in a ratio sufficient to provide at least about 5% by weight, preferably at least about 10% by weight onium ion compound, based on the dry weight of the layered material. The onium ion compound can be intercalated into the coupling agent-reacted layered material simultaneously with the coupling agent contact with the layered material and simultaneously with the intercalation of the oligomer or polymer, or, the oligomer or polymer may be intercalated after coupling agent-reaction and intercalation of the onium ion spacing/compatibilizing agent. In preferred embodiment, the dry onium ion-intercalated clay is extruded with oligomer or polymer for direct compounding, with intercalation of the oligomer or polymer melt into the coupling agent-reacted and onium ion-intercalated layered material (CAO Material).

The onium ion spacing/compatibilizing agents have an affinity for the phyllosilicate so that they are ion-exchanged with the exchangeable cations on the inner surfaces of the silicate platelets, in the interlayer spaces.

Coupling Agents

Suitable coupling agents include the following, and mixtures of any two or more: octyltriethoxysilane, methyltriethoxysilane, proprietary nonionic silane dispersing agent, methyltrimethoxysilane, tris-[3-(trimethoxysilyl) propyl] isocyanurate, vinyltriethoxysilane, vinyltrimethoxysilane, vinyl-tris-(2-methoxyethoxy) silane, vinylmethyldimethoxysilane, gamma-methacryloxypropyltrimethoxysilane, beta-(3,4-epoxycyclohexyl)ethyltrimethoxysilane, gamma-glycidoxypropyltrimethoxysilane, gamma-mercaptopropyltrimethoxysilane, proprietary polysulfide silane, bis-(3-[triethoxysilyl]propyl) tetrasulfane, proprietary disulfide silane, gamma-aminopropyltriethoxysilane, aminoalkyl silicone solution, modified aminoorganosilane, gamma-aminopropyltrimethoxysilane, N-beta-(aminoethyl)-gamma-aminopropyltrimethoxysilane, modified aminoorganosilane (40% in methanol), modified aminosilane (50% in methanol), triaminofunctional silane, bis-(gamma-trimethoxysilyl-propyl)amine, N-phenyl-gamma-aminopropyltrimethoxysilane, organomodified polydimethylsiloxane, polyazamide silane (50% in methanol), N-beta-(aminoethyl)-gamma-aminopropylmethyldimethoxysilane, gamma-ureidopropyltrialkoxysilane (50% in methanol), gamma-ureidopropyltrimethoxysilane, and gamma-isocyanatopropyltriethoxysilane.

In accordance with a preferred embodiment of the present invention, the coupling agent-reacted/onium ion-intercalated layered material can be intercalated with an oligomer or polymer and then dispersed into one or more melt-processible thermoplastic and/or thermosetting matrix oligomers or polymers, or mixtures thereof, by direct compounding. Matrix polymers for use in this embodiment of the process of this invention may vary widely, the only requirement is that they are melt processible. In this embodiment of the invention, the polymer, preferably a non-polar oligomer or polymer, e.g., a vinyl polymer or copolymer, particularly a polypropylene homopolymer having a melt flow index of preferably about 0.5 to about 60, more preferably about 5–10. The matrix polymer is intercalated into the coupling agent-reacted and onium ion-intercalated layered material simultaneously with dispersing the oligomer or polymer-intercalated clay uniformly into the matrix polymer melt, as in an extruder.

Other thermoplastic resins and rubbers for use as matrix oligomers or polymers in the practice of this invention may vary widely. Illustrative of useful thermoplastic resins, which may be used alone or in admixture, are polyactones such as poly(pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly(tetramethylene adipate), poly (ethylene adipate), poly(1,4-butylene adipate), poly (ethylene succinate), poly(2,3-butylene succinate), polyether diols and the like; polycarbonates such as poly [methane bis(4-phenyl) carbonate], poly [1,1-ether bis(4-phenyl) carbonate], poly[diphenylmethane bis(4-phenyl) carbonate], poly[1,1-cyclohexane bis(4-phenyl)carbonate] and the like; polysulfones; polyethers; polyketones; polyamides such as poly(4-amino butyric acid), poly (hexamethylene adipamide), poly(6-aminohexanoic acid), poly(m-xylylene adipamide) or MXD6 nylon, poly(p-xylylene sebacamide), poly(2,2,2-trimethyl hexamethylene terephthalamide), poly(metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly(ethylene oxybenzoate) (A-TELL), poly(para-hydroxybenzoate) (EKONOL), poly (1,4-cyclohexylidene dimethylene terephthalate) (KODEL) (cis), poly(1,4-cyclohexylidene dimethylene terephthalate) (KODEL) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly (urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexyl-methane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2, 3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly (styrene)-poly(butadiene)-poly(styrene) block copolymer manufactured by Shell Chemical Company under the trade name KRATON®.

Useful thermoplastic polymers for use as a matrix polymer are thermoplastic polymers such as polyamides, particularly nylons, e.g., MXD6 nylon. Polyamides which may be used as matrix polymers in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

—NHCOR$^2$COHNR$^3$— in which R$^2$ is an alkylene group of at least 2 carbon atoms. preferably from about 2 to about 11; or arylene having at least about 6 carbon atoms, preferably about 6 to about 17 carbon atoms; and R$^3$ is selected from R$^2$ and aryl groups. Also, included are copolyamides and terpolyamides obtained by known methods, for example, by condensation of hexamethylene diamine or meta-xylylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly (hexamethylene terephthalamide), poly(heptamethylene pimelamide) (nylon 7,7), poly(octamethylene sebacamide) (nylon 8,8), poly(nonamethylene azelamide) (nylon 9,9) poly(decamethylene azelamide) (nylon 10,9), poly (decamethylene sebacamide) (nylon 10,10), poly [bis(4-amino cyclohexyl)methane-1,10-decane-carboxamide)], poly(m-xylylene adipamide), poly(p-xylylene sebacamide), poly(2,2,2-trimethyl hexamethylene terephthalamide), poly (piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Other matrix or host polymers which may be employed in admixture with the onium ion and polymer intercalates of the present invention to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly (ethylene terephthalate), poly(cyclohexylenedimethylene terephthalate), poly(ethylene dodecate), poly(butylene terephthalate), poly[ethylene(2,7-naphthalate)], poly (methaphenylene isophthalate), poly(glycolic acid), poly (ethylene succinate), poly(ethylene adipate), poly(ethylene sebacate), poly(decamethylene azelate), poly (decamethylene adipate), poly(decamethylene sebacate), poly(dimethylpropiolactone), poly(para-hydroxybenzoate) (EKONOL), poly(ethylene oxybenzoate) (A-tell), poly (ethylene isophthalate), poly(tetramethylene terephthalate, poly(hexamethylene terephthalate), poly(decamethylene terephthalate), poly( 1,4-cyclohexane dimethylene terephthalate) (trans), poly(ethylene 1,5-naphthalate), poly (ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and a o-phthalic acid, 1,3-naphthalene-dicarboxylic acid, 1,4-naphthalenedicarboxylic acid, 2,6-naphthalenedicarboxylic acid, 2,7-naphthalene-dicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

The most preferred thermoplastic homopolymers and copolymer matrix polymers for forming nanocomposites with the coupling agent-reacted onium ion/polymer co-intercalated layered materials of the present invention are polymers formed by polymerization of alpha-beta-unsaturated monomers of the formula:

wherein:

R[4] and R[5] are the same or different and are cyano, phenyl, carboxy, alkylester, halo, alkyl, or alkyl substituted with one or more chloro or fluoro, or hydrogen atoms. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are homopolymers of poly (ethylene) and poly(propylene), and block and random copolymers thereof.

The following polypropylenes and copolymers of polypropylene are all useful as both non-polar intercalants and as matrix polymers in accordance with the present invention:

Polypropylene homopolymer contains only propylene monomer in the polymer chain. The homopolymer provides stiffness and toughness but exhibits low impact strength at low temperatures, and clarity is too low for some applications. Propylene copolymers contain one or more different types of monomers in the polymer chain. Random copolymers are used in applications requiring higher clarity or a lower melting point, and impact copolymers are used in automotive and other applications that require high impact resistance at low temperatures. Thermoplastic olefins (TPO) and thermoplastic vulcanizates provide elastomeric properties for automotive, medical, and other applications.

Random block copolymers are recently developed copolymers in which particles of ethylene propylene rubber are distributed through a random copolymer polypropylene matrix. Random block copolymers display high stiffness and toughness, and the added softness of the random copolymer matrix results in less stress whitening than in impact copolymers. Random copolymers are produced by adding the comonomer, ethylene or, less commonly, 1-butene or 1-hexene, to the reactor during the polymerization reaction. The comonomer substitutes for propylene in the growing polymer chain. Insertions are randomly or statistically distributed along the chain and can consist of single monomers, or multiple monomers (two or more sequential ethylene molecules along the polymer chain). Random copolymers generally contain 1–7 wt. % ethylene, with 75% single and 25% multiple insertions. In practice, depending on the catalyst, polymerization conditions, and the reactivity of the comonomer compared to propylene, random copolymers can become somewhat blocky, with some regions of the polymer chain containing only polypropylene units and other regions containing only comonomer.

The structure of random copolymers is similar to isotactic polypropylene, but the regular, repeating arrangement of atoms is randomly disrupted by the presence of comonomer units. The effect is similar to that of increasing atacticity. Crystallinity is reduced, and mobility of the polymer chain is increased due to less steric interaction of the pendant methyl groups of polypropylene.

Plastomers are very low density (<0.880 g/cc) copolymers of ethylene and an olefin (such as ethylene-butene) produced using metallocene catalysts. Due to the single polymerization site on metallocene catalysts, comonomer can be inserted uniformly, producing a homogeneous compolymer with both elastomeric and plastic characteristics. They have a narrow molecular weight distribution and more long-chain branching.

Impact copolymers containing ethylene-propylene rubber are also useful as the matrix polymer and polymer intercalate in accordance with the present invention. Homopolymer formed in the first reactor is transferred to a second reactor, where copolymerization with ethylene is performed to produce ethylene-propylene rubber within the polypropylene matrix.

Thermoplastic olefins (TPOs) are a blend of two polymer systems, with usually polypropylene or polyvinyl chloride as the crystalline matrix and ethylene propylene rubber, ethylene propylene diene monomer (EPDM), or metallocene-produced plastomers (i.e. ethylene-octene, ethylene-butene) as the elastomeric phase. The distinction between impact copolymers and thermoplastic olefins is not well defined; usually elastomer levels over about 20% are referred to as thermoplastic olefins. TPOs can be made by blending EPDM or EP rubber with polypropylene in a batch mixer or by forming the EP rubber phase during propylene polymerization in the reactor.

Depending on the formulation, thermoplastic olefins can be flexible or rigid; flexural moduli can range from 70 MPa (10,000 psi) to 2000 MPa (300,000 psi). Typical properties include high heat resistance, high melt flow, and superior low temperature impact resistance. Thermoplastic olefins can maintain ductile impact behavior at −34° C. (−30° F.).

In testing of equivalent 70/30 polypropylene/elastomer blends, plastomers doubled the weld-line strength and raised the melt index by up to 50% compared to EPDM, with a superior balance of flow and low-temperature impact properties. Plastomers maintained ductile behavior at −34° C. (−30° F.) with homopolymers of 4–35 g/10 minute melt flow indices, while EPDM and EPM blends were brittle with polypropylenes of 20 g/10 minute melt indices.

Thermoplastic vulcanizates (TPV), a type of thermoplastic elastomer, are a blend of a thermoplastic, usually polypropylene, and a rubber, similar to a thermoplastic olefin; however, the rubber phase in thermoplastic vulcanizates is crosslinked or vulcanized. EPDM is most commonly used as the elastomeric phase; other elastomers used include EPR rubber, butyl rubber, and natural rubber. The elastomeric phase, consisting of small, 1–2 μm rubber particles, is dispersed in the continuous polypropylene matrix. Elastomeric performance properties of the TPV are determined by the crosslinking of the elastomeric phase, while the polypropylene phase provides for melt processability. TPVs can be fully or partially crosslinked.

The matrix polymer of the present invention may include various optional components which are additives commonly employed with polymeric compositions. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of coupling agent-reacted/onium ion/polymer co-intercalated layered material included may vary widely. It is preferred that the intercalate or platelet loading be less than about 10% by weight of the polymeric composition. Intercalate or platelet particle loadings within the range of about 0.01% to about 40% by weight, preferably about 0.05% to about 20%, more preferably about 0.5% to about 10% of the total weight of the composition.

In accordance with an important feature of the present invention, the intercalate and/or platelet/carrier compositions of the present invention can be manufactured in a concentrated form, e.g., as a concentrate, e.g., having about 10–90%, preferably about 20–80% intercalate and/or exfoliated platelets of layered material and about 10–90%, preferably about 20–80% matrix polymer. The concentrate can be dispersed in the matrix polymer and optionally exfoliated, before or after addition to a polymer melt to a desired intercalate and/or platelet loading.

When shear is employed for exfoliation, any method which can be used to apply a shear to the intercalate/matrix polymer nanocomposite composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant oligomer(s) or polymer(s) at one end of an extruder (single or double screw) and receiving the sheared material at the other end of the extruder. The temperature of the layered material/intercalant oligomer or polymer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

In accordance with an important feature of the present invention, it has been found that the coupling agent-reacted/onium ion-intercalated clay can be intercalated with non-polar polymers by direct compounding, i.e., by mixing the coupling agent-reacted/onium ion-intercalated layered material, e.g., smectite clay, directly with the non-polar oligomer or polymer in an extruder to make the coupling agent-reacted/onium ion/polymer co-intercalated clay without significant exfoliation of the clay platelets. The intercalate-filled matrix polymer extrudes into a homogeneous nanocomposite with unexpectedly homogenous dispersion of the intercalate, with exceptional strength characteristics. The intercalate dispersed within the matrix polymer is a combination of exfoliated individual platelets and multi-layer tactoids dispersed in the matrix polymer. The tactoids have the thickness of at least two individual platelet layers plus one to five monolayer thicknesses of intercalated matrix polymer, and include small multiples or aggregates of platelets, in a coplanar aggregate, having the coupling agent bonded to the clay platelet edges for easy intercalation of onium ions and polymer intercalants bonded or complexed or ion-exchanged to the platelet surface(s).

Molding compositions comprising a polyolefin matrix polymer or copolymer, preferably a combination of 0.5–10% by weight, more preferably 1–6% by weight, maleic anhydride-modified polypropylene, and 90–99.5% by weight, more preferably 94–99% by weight, polypropylene containing a desired loading of the coupling agent-reacted/onium ion/polymer co-intercalates of the present invention, and/or individual platelets obtained from exfoliation of the intercalates manufactured according to the present invention, are outstandingly suitable for the production of sheets, films and panels having valuable properties. Such sheets, films and panels may be shaped by conventional processes, such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets, films and panels can be laminated to other plastic films, sheets or panels and this is preferably effected by co-extrusion, the sheets being bonded in the molten state. The surfaces of the sheets, films and panels, including those in the embossed form, can be improved or finished by conventional methods, for example by lacquering or by the application of protective films.

The nanocomposites of the present invention are useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed intercalate, and/or exfoliated platelets thereof, which has been coupling agent-reacted, onium ion and oligomer or polymer co-intercalated in accordance with the present invention, and a matrix polymer that form the preferred embodiment of the nanocomposite compositions of the present invention are formed into a film by suitable film-forming methods. Typically, the composition is melted and forced through a film forming die after oligomer or polymer intercalation and compounding. The film of the nanocomposite may go through sequential steps to cause the intercalate and/or exfoliated platelets thereof to be further oriented so the major planes through the intercalates and/or platelets thereof are substantially parallel to the major plane through the film. One method to accomplish this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits in addition to decreased permeability to gases, particularly $O_2$: increased modulus; increased wet strength; increased dimensional stability; and decreased moisture adsorption.

EXAMPLES

Example 1

Example 1 demonstrates the formation of silane-treated Nanomer A 137-ODA-CWC.

One hundred grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75~80° C. 37.8 g of Octadecyl-amine, available from Akzo Nobel, was mixed with 70 ml 2 N HCl in 1 liter 75~80° C. de-ionized water. The amine-HCl solution was introduced into the clay dispersion, followed by vigorous mixing. The mixture was adjusted to pH 3~4 by acetic acid, and maintained at 75~80° C. for about 30 minutes. After thorough washing with de-ionized water, the Octadecyl-ammonium treated sodium montmorillonite clay was collected by filtration. The filter cake was re-dispersed into 3 liters of 75~80° C. water.

In a separate container, 2 g Octyltriethoxysilane (A 137) was dissolved in 40 g 9:1 (w/w) blend of iso-propanol and de-ionized water. The silane solution was stirred for 1 hour and then added to the dispersed clay slurry. After mixing 20 minutes, the solid was collected by filtration and placed into a 75~80° C. oven to dry followed by particle size reduction. The filter cake also can be freeze-dried. The dried material has a d001 of 22 Å as measured by X-ray diffraction and was coded as A137-ODA-CWC.

Example 2

The procedure of Example 1 was repeated to produce a silane-treated organoclay except that Octyltriethoxysilane was replaced by 3-aminopropyltriethoxysilane (A1100). The dried material has a d001 of 22 Å as measured by X-ray diffraction and was coded as A1100-ODA-CWC.

Comparative Example 1

Comparative Example 1 demonstrates the preparation of conventional ODA-CWC nanomer (without silane treatment).

One hundred grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75~80° C. 37.8 g of Octadecyl-amine, available from Akzo Nobel, was mixed with 70 ml, 2 N HCl in 1 liter 75~80° C. de-ionized water. The amine-HCl solution was introduced to the clay dispersion, followed by vigorous mixing. The mixture was maintained at 75~80° C. for about 30 minutes, followed by a de-watering process, such as filtration. The filter cake was re-dispersed into 4 liters 75~80° C. water and the solid was collected and placed into a 75~80° C. oven to dry followed by particle size reduction. The filter cake also can be freeze-dried. The dried material has a d001 of 22 Å as measured by X-ray diffraction and was coded as ODA-CWC.

Comparative Example 2

Neat polypropylene (Montell Profax 6523) with a melt flow of 4.0 g/10 minutes was extruded in a twin screw extruder at 180–190° C. The obtained pellets were injection molded into testing bars and mechanical properties were tested according to ASTM testing methods. The results are shown in Table 1.

Example 3

Example 3 demonstrates the formation and properties of a polypropylene (PP) nanocomposite with a silane-treated and onium ion-treated nanomer through a direct melt compounding method.

Six parts of A1100-ODA-CWC was incorporated into 92 parts of polypropylene and 2 parts of maleic anhydride-modified polypropylene (MAPP) using a twin screw extruder at 180–190° C. The presence of MAPP will help to improve the adhesion between the organo-clay and the polypropylene matrix polymer. The resulting pellets were injection molded into the testing bars. X-ray diffraction shows the treated clay has a well ordered intercalation structure with a d001 of 29 Å. Physical properties of the thus-formed specimens were measured, and the results are shown in Table 1.

Comparative Example 3

Example 3 demonstrates the formation and properties of a PP nanocomposite with conventional ODA-CWC nanomer (no silane treatment) through a direct melt compounding method.

Six parts of ODA-CWC was incorporated into 92 parts of polypropylene and 2 parts of maleic anhydride-modified polypropylene (MAPP) using a twin screw extruder at 180–190° C. The presence of MAPP will help to improve the adhesion between the organo-clay and the polypropylene matrix polymer. The resulting pellets were injection molded into testing bars. X-ray diffraction shows the treated clay has a well ordered intercalation structure with a d001 of 28 Å. Physical properties of the thus-formed specimens were measured, and the results are shown in Table 1.

Example 4

Example 4 demonstrates the in situ formation of silane-treated onium ion-intercalated nanomer with the later addition of a silane coupling agent in the extrusion process.

The procedure of Comparative Example 3 was repeated, with the exception that 0.09 parts of silane A 1100 was added during extrusion. The resulting nanocomposite has a d001 of 29 Å. The physical properties of the testing bars are shown in Table 1. In the case of Example 3 and Example 4, the presence of silane will improve the interaction between the onium ion-intercalated clay and the polypropylene matrix polymer. As a result, both approaches give improved mechanical properties compared with normal ODA-CWC clay (Comparative Example 3).

Example 5

Example 5 demonstrates the preparation of a polypropylene matrix polymer/nanomer master batch, or concentrate, by using the silane-treated nanomers, and the properties of the subsequent nanocomposites.

by using the conventional nanomer and silane coupling agent through a mixing device, and the properties of the subsequent nanocomposites.

The procedure of Example 5 was repeated, except that 0.009 parts of A 1100 was added during extrusion. The thus-formed nanocomposite has a d001 of 30 Å. In Examples 5–7, since the clays were pre-mixed in MAPP matrix polymer, it is easier for the clay particles to disperse homogeneously within the polypropylene matrix polymer. As a result, better dispersion and improved mechanical properties are obtained by this master batch approach. In addition, silane treatment also improves the interaction between clay and the matrix polymer; and silane-treated clay (Examples 6 and 7) shows better mechanical properties, especially tensile strength and heat distortion temperature, compared with non-silane treated clay (Example 5).

TABLE 1

Mechanical Properties of PP, and PP-Clay Nanocomposites

|  | Processing Method | Filler | Tensile Strength (Mpa) | Tensile Modulus (Gpa) | Flexural Strength (Mpa) | Flexural Modulus (Gpa) | Notched Izod Impact (ft-lb/in) | HDT (° C.) |
|---|---|---|---|---|---|---|---|---|
| Comparative Example 2 Neat PP Montell Profax 6523 | Direct melt compounding | None | 29.6 | 1.3 | 37.6 | 1.3 | 0.5 | 92 |
| Example 3 | Direct melt compounding | A1100-ODA-CWC | 32.7 | 1.8 | 46.5 | 1.7 | 0.6 | 104 |
| Example 4 | Direct melt compounding | ODA-CWC* | 32.9 | 2.0 | 48.3 | 1.8 | 0.6 | 107 |
| Comparative Example 3 | Direct melt compounding | ODA-CWC | 33.2 | 1.7 | 46.3 | 1.6 | 0.5 | 103 |
| Example 5 | Master batch | ODA-CWC | 35 | 1.8 | 48.8 | 2.0 | 0.6 | 100 |
| Example 6 | Master batch | A1100-ODA-CWC | 36.3 | 1.9 | 50.9 | 2.0 | 0.6 | 108 |
| Example 7 | Master batch | ODA-CWC* | 35.4 | 2.0 | 51.2 | 2.1 | 0.6 | 109 |

*silane A1100 was added during extrusion.

Seventy parts of ODA-CWC was mixed with 30 parts of MAPP in a mixing bowl at 180° C. for 5 minutes to make a master batch. The resulting composition (ODA-CWC-MAPP) was chopped down into powder using a grinder. 8.6 parts of ODA-CWC-MAPP composition was mixed with 89.4 parts of polypropylene and 2 parts of MAPP in a twin screw extruder at 180–190° C. The resulting pellets were injection molded into testing bars. The nanocomposite has a d001 of 29 Å. Physical properties of the thus-formed specimens were measured, and the results are shown in Table 1.

Example 6

Example 5 demonstrates the preparation of a polypropylene matrix polymer/nanomer master batch, or concentrate, by using the silane-treated nanomers, and the properties of the subsequent nanocomposites.

The procedure of Example 5 was repeated, except that ODA-CWC was replaced by A1100-ODA-CWC. The nanocomposite has a d001 of 29 Å.

Example 7

Example 7 demonstrates the preparation of a polypropylene matrix polymer/nanomer master batch, or concentrate,

Example 8

Example 8 demonstrates the formation of a Nylon-6 nanocomposite with silane-treated nanomer and its mechanical properties.

Four parts of A-137-ODA-CWC (Example 1) was incorporated into 96 parts of Nylon-6 (Allied Signal Capron 8202) by using a twin screw extruder at 230–250° C. The resulting pellets were injection molded into testing bars. X-ray diffraction shows the treated clay has a very broad diffraction at about 40 Å. Physical properties of the thus-formed specimens were measured, and the results are shown in Table 2.

Figure 1:
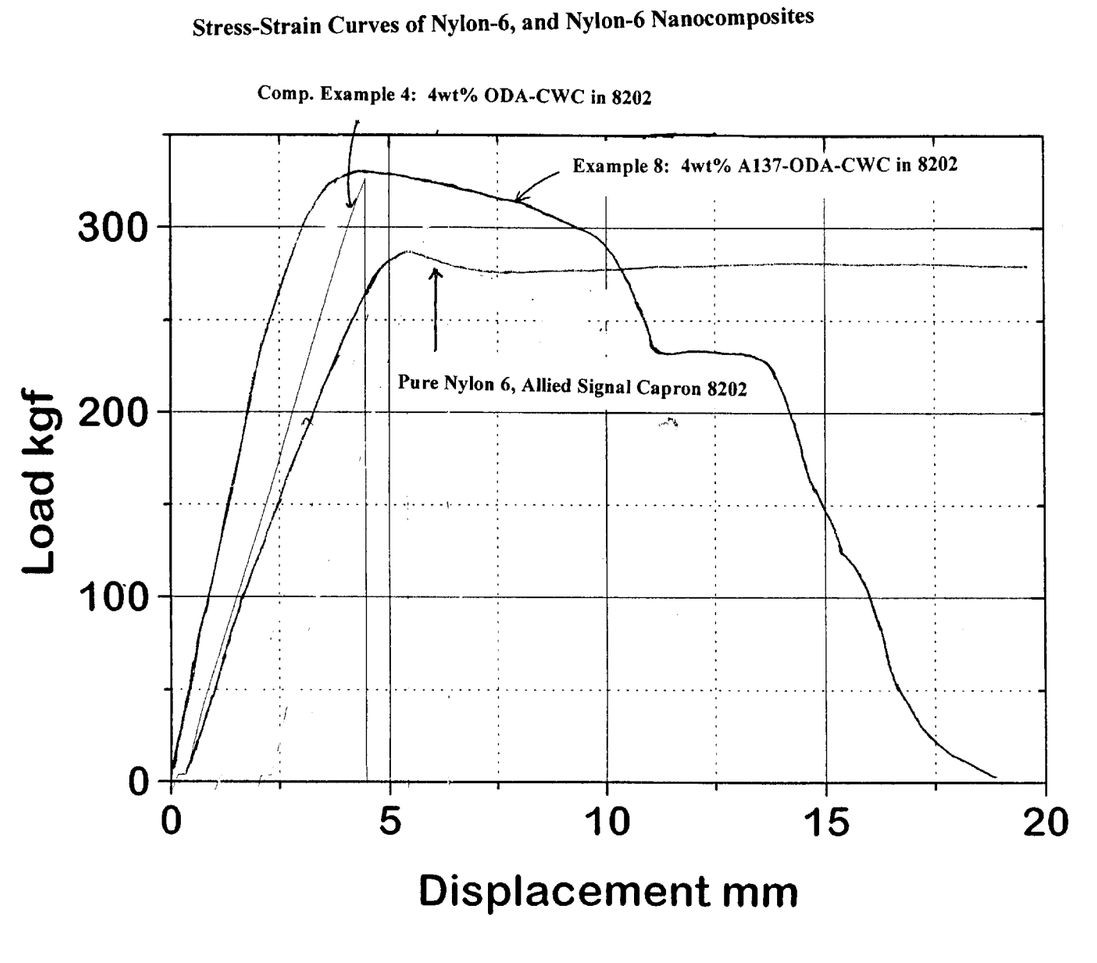
The drawing is a graph comparing the Stress-Strain curves for Nylon-6; Nylon-6 intercalated with onium ions; and Nylon-6 intercalated with onium ions and edge-reacted with a silane coupling agent (CAO Material) in accordance with the present invention.

As shown in the figure (Stress Strain Curves of Nylon 6, and Nylon-6 nanocomposites), the pure nylon-6 is very ductile; however, a conventional nanocomposite made by incorporation of 4% of a nanomer made by intercalation of a sodium montmorillonite clay with an onium ion (octadecylamine) in nylon-6 without a coupling agent reaction (Example 4) is very brittle and non-ductile, whereas the same nanocomposite wherein the nanomer includes the edge —OH coupling agent reaction (Example 8) is unexpectedly more ductile.

Comparative Example 4

Comparative Example 4 demonstrates the formation of a Nylon-6 nanocomposite with conventional nanomer and its mechanical properties.

Four parts of ODA-CWC (Comparative example 1) was incorporated into 96 parts of Nylon-6 (Allied Signal Capron 8202) by using a twin screw extruder at 230–250° C. The resulting pellets were injection molded into testing bars. X-ray diffraction shows the treated clay has a very broad diffraction at about 40 Å. Physical properties of the thus-formed specimens were measured, and the results are shown in Table 2.

For comparison, the Stress-Strain curves of the neat Nylon-6 nanocomposites in Example 8 and Comparative Example 4, were plotted together in FIG. 1. It clearly demonstrates the superior properties of the A137-ODA-CWC in Nylon-6. Particularly, the ductile behavior after the yield point. The enhanced interaction between the Nylon-6 resin with the silane-reacted edge hydroxy moieties of the clay surface was concluded to contribute to this observation.

TABLE 2

Mechanical Properties for Nylon-6-Clay Nanocomposites.

| | Sample | Flexural Strength (MPa) | Flexural Modulus (GPa) | Tensile Strength (GPa) | Tensile Modulus (Gpa) | Elong @ Yield (%) | Ultimate Elongation (%) | % Strain at Break (%) | DTUL @ 264 psi (° C.) |
|---|---|---|---|---|---|---|---|---|---|
| | Capron 8202 | 10 | 2.5 | 72.5 | 2.4 | 5 | 55.4 | 55.4 | 58 |
| Comp. Example 4 | 4 wt % ODA/CWC | 137.0 | 3.5 | 74.0 | 3.0 | 4 | 4.0 | 3.2 | 98.7 |
| Example 8 | 4 wt % A137-ODA-CWC | 126 | 3.6 | 82.0 | 3.5 | 4.2 | 13.3 | 3.2 | 96 |

What is claimed is:

1. A nanocomposite composition comprising about 0.05 weight percent to about 40 weight percent of a layered silicate material reacted at platelet edges with a coupling agent and co-intercalated with an onium ion spacing/compatibilizing agent and a melt processable oligomer or polymer by melt compounding; and about 60 weight percent to about 99.95 weight percent of a matrix polymer, wherein the intercalated layered silicate material is dispersed uniformly throughout the matrix polymer.

2. A nanocomposite composition in accordance with claim 1, wherein the matrix polymer is the oligomer or polymer co-intercalated into the layered silicate material.

3. A nanocomposite composition in accordance with claim 2, wherein the matrix polymer is co-intercalated into the layered silicate material while dispersing the layered material throughout the matrix polymer.

4. A nanocomposite composition in accordance with claim 1, wherein the matrix polymer is a polymer or oligomer of a polyolefin.

5. A nanocomposite composition in accordance with claim 1, wherein the onium ions include at least one moiety covalently bonded to a positively charged nitrogen atom that has a length of at least six carbon atoms.

6. A nanocomposite composition comprising a matrix polymer in an amount of about 40% to about 99.95% by weight, and about 0.05% to about 60% by weight of an intercalated phyllosilicate material formed by reacting a phyllosilicate at phyllosilicate platelet edges with a coupling agent selected from the group consisting of an organosilane, an organotitanate, an organoaluminate, an organozironate, and mixtures thereof, and contacting the phyllosilicate with intercalant onium ions, wherein intercalation of the onium ions is achieved by contact of the phyllosilicate in an intercalating composition, having a molar ratio of onium ions:phyllosilicate interlayer exchangeable cations of at least about 0.25:1 to achieve ion-exchange of the onium ions between adjacent spaced platelets of the phyllosilicate to expand the spacing between a predominance of the adjacent phyllosilicate platelets at least about 3 Å, when measured after ion-exchange of the onium ions, wherein said matrix polymer is melt processed with said intercalated phyllosilicate material.

7. A composition in accordance with claim 6, further including a second intercalant, wherein the oligomer or polymer is a homopolymer or copolymer of one or more polyolefins.

8. A composition in accordance with claim 7, wherein the second intercalant is intercalated into the phyllosilicate from an intercalating composition containing said second intercalant in a concentration of at least about 5% by weight, based on the dry weight of the phyllosilicate in the intercalating composition.

9. A composition in accordance with claim 7, wherein the concentration of the second intercalant in said intercalating composition is at least about 20% by weight, based on the dry weight of the phyllosilicate in the intercalating composition.

10. A composition in accordance with claim 9, wherein the concentration of the second intercalant in said intercalating composition is at least about 30% by weight, based on the dry weight of the phyllosilicate in the intercalating composition.

11. A composition in accordance with claim 10, wherein the concentration of the second intercalant in said intercalating composition in the range of about 50% to about 80% by weight, based on the dry weight of the phyllosilicate in the intercalating compound.

12. A composition in accordance with claim 10, wherein the concentration of the second intercalant in said intercalating composition in the range of about 50% to about 200% by weight, based on the dry weight of the phyllosilicate in the intercalating composition.

13. A composition in accordance with claim 6, wherein the molar ratio of intercalant onium ions:phyllosilicate interlayer exchangeable cations is at least 0.5:1.

14. A composition in accordance with claim 6, wherein the molar ratio of intercalant onium ions:phyllosilicate interlayer exchangeable cations is at least 1:1.

15. A composition in accordance with claim 6, wherein the onium ions are multi-onium ion compounds that include at least two primary, secondary, tertiary or quaternary ammonium, phosphonium, sulfonium, or oxonium ions.

16. A composition in accordance with claim 6, wherein the matrix polymer is selected from the group consisting of polyethylene, polypropylene, and copolymers of ethylene and propylene.

17. A nanocomposite concentrate composition comprising about 10% by weight to about 90% by weight of a layered silicate material reacted at layered silicate platelet edges with a coupling agent, and co-intercalated with an onium compound and a non-polar polymer or oligomer; and about 10 weight percent to about 90 weight percent of a non-polar matrix polymer, wherein the co-intercalated layered silicate material is melt processed with and dispersed uniformly throughout the matrix polymer.

18. A nanocomposite composition in accordance with claim 17, wherein the matrix polymer is intercalated into the layered silicate material.

19. A nanocomposite composition in accordance with claim 18, wherein the matrix polymer is intercalated into the layered silicate material while dispersing the layered material throughout the matrix polymer.

20. A nanocomposite composition in accordance with claim 18, wherein the layered silicate material is intercalated with 10 to 90 weight percent of a non-polar oligomer or polymer prior to dispersing the layered silicate material throughout the matrix polymer.

21. A nanocomposite composition in accordance with claim 17, wherein both the matrix polymer and the polymer intercalated into the layered material are a polymer or oligomer of a polyolefin.

22. A nanocomposite composition in accordance with claim 17, wherein prior to intercalating the layered material with the polyolefin polymer, the layered material is first reacted with a silane coupling agent and intercalated with onium ions, said onium ions including at least one moiety covalently bonded to a positively charged nitrogen atom that has a length of at least six carbon atoms.

23. A method of increasing the strength of a matrix polymer comprising dispersing throughout said matrix polymer by melt processing, in an amount of about 0.05% by weight to about 30% by weight, based on the total weight of the matrix polymer and the intercalate, an intercalate formed by reacting a phyllosilicate at phyllosilicate platelet edges with a silane coupling agent, and intercalating an onium ion between layers of the phyllosilicate, wherein a portion of the matrix polymer is co-intercalated between the layers of the phyllosilicate by melt processing.

24. A method in accordance with claim 23, wherein the matrix polymer is a polyvinyl polymer.

25. A method in accordance with claim 23, wherein the matrix polymer is co-intercalated into the phyllosilicate by melt processing while dispersing the phyllosilicate material throughout the matrix polymer.

26. A method in accordance with claim 23, wherein the matrix polymer is co-intercalated into the phyllosilicate prior to dispersing the phyllosilicate throughout the matrix polymer.

27. A method in accordance with claim 23, wherein the matrix polymer is a polymer or oligomer selected from polyethylene, polypropylene, and a copolymer of ethylene and propylene.

28. A method in accordance with claim 23, wherein the onium ions include at least one moiety covalently bonded to a positively nitrogen atom that has a length of at least six carbon atoms.

29. A method of manufacturing a composite material containing about 10% to about 99.95% by weight of a matrix polymer, and about 0.05% to about 60% by weight of a coupling agent reacted and onium ion-intercalated phyllosilicate material, said intercalated phyllosilicate having an intercalant onium ion spacing/compatibilizing agent intercalated between and bonded, by ion-exchange, to an inner surface of the phyllosilicate platelets, comprising:

reacting the phyllosilicate at phyllosilicate platelet edges with a coupling agent;

contacting the phyllosilicate with said intercalant onium ion spacing/compatibilizing agent, to achieve intercalation of said intercalant onium ion spacing/compatibilizing agent between said adjacent phyllosilicate platelets in an amount sufficient to space said adjacent phyllosilicate platelets a distance of at least about 3 Å; and dispersing the intercalate throughout said matrix polymer by melt processing to achieve intercalation of a portion of the matrix polymer between the phyllosilicate platelets.

30. The method of claim 29, wherein said phyllosilicate is contacted with said intercalant onium ion spacing/compatibilizing agent, said phyllosilicate, and an oligomer or polymer intercalant, wherein the concentration of the onium ion spacing/compatibilizing agent is in a molar ratio of onium ions:phyllosilicate interlayer exchangeable cations of at least 0.25:1.

31. The method of claim 30, wherein said phyllosilicate is contacted with said intercalant onium ion spacing/compatibilizing agent, said phyllosilicate, and an oligomer or polymer intercalant, wherein the concentration of the onium ion spacing/compatibilizing agent is in a molar ratio of onium ions:phyllosilicate interlayer exchangeable cations of at least 0.5:1.

32. The method of claim 31, wherein said phyllosilicate is contacted with said intercalant onium ion spacing/compatibilizing agent, said phyllosilicate, and an oligomer or polymer intercalant, wherein the concentration of the onium ion spacing/compatibilizing agent is in a molar ratio of onium ions:phyllosilicate interlayer exchangeable cations of at least 1:1.

33. A method of manufacturing a composite material containing about 40% to about 99.95% by weight of a matrix thermoplastic or thermosetting polymer, and about 0.05% to about 60% by weight of an intercalated phyllosilicate material, said intercalated phyllosilicate having platelet edge —OH functional groups reacted with a silane coupling agent and having an intercalant onium ion spacing/compatibilizing agent intercalated between adjacent phyllosilicate platelets comprising:

contacting the phyllosilicate with the silane coupling agent to react the coupling agent with platelet edge —OH groups;

contacting the phyllosilicate with an intercalating composition including an intercalant onium ion spacing/compatibilizing agent in a molar ratio of onium ions:phyllosilicate interlayer cations of at least 0.25:1, and an oligomer or polymer intercalant, to achieve intercalation of said intercalant onium ion spacing/compatibilizing agent and said oligomer or polymer intercalant between said adjacent phyllosilicate platelets in an amount sufficient to space said adjacent phyllosilicate platelets at least an additional 3 Å;

combining the intercalated phyllosilicate with said thermoplastic or thermosetting matrix polymer, and heating the matrix polymer sufficiently to provide for flow of said matrix polymer thereby melt processing the matrix polymer with the intercalated phyllosilicate; and dispersing said intercalated phyllosilicate throughout said matrix polymer.

34. A method in accordance with claim 33, wherein the intercalating composition includes about 10% to about 200% by weight of said oligomer or polymer intercalant, based on the dry weight of phyllosilicate contacted in said intercalating composition.

35. A method in accordance with claim 33, wherein the amount of onium ion spacing/compatibilizing agent intercalated into the phyllosilicate material is in a molar ratio of at least 0.5:1, onium ions:exchangeable cations in the interlayer spaces of the phyllosilicate material.

36. A method in accordance with claim 35, wherein the amount of intercalant onium ion spacing/compatibilizing agent intercalated into the phyllosilicate material is in a molar ratio of at least 1:1, onium ions:exchangeable cations in the interlayer spaces of the phyllosilicate material.

37. A method in accordance with claim 36, wherein the molar ratio of intercalated onium ion spacing/compatibilizing agent to interlayer phyllosilicate cations is from about 1:1 to about 1:5.

38. A method in accordance with claim 33, wherein the weight ratio of the intercalant oligomer or polymer to phyllosilicate material, dry basis, is from about 20 grams of oligomer or polymer intercalant per 100 grams of phyllosilicate material to about 200 grams of oligomer or polymer intercalant per 100 grams of phyllosilicate material.

39. A method in accordance with claim 33, wherein the oligomer or polymer is intercalated into the phyllosilicate by melting the oligomer or polymer and dispersing the phyllosilicate throughout the oligomer or polymer melt.

40. A method in accordance with claim 39, wherein the mixing is accomplished in an extruder.

41. A method of manufacturing a composite material containing about 40% to about 99.95% by weight of an oligomer or polymer, and about 0.05% to about 60% by weight of a coupling agent-reacted and onium ion-intercalated phyllosilicate material comprising, reacting the phyllosilicate at phyllosilicate platelet edges with a coupling agent, and intercalating the phyllosilicate material with an onium ion spacing/compatibilizing agent by contacting the phyllosilicate with onium ions in a molar ratio of onium ions:phyllosilicate interlayer exchangeable cations of at least 0.25:1;

forming a mixture of the coupling agent-reacted, intercalated phyllosilicate material with a matrix oligomer or polymer; and subjecting the mixture to conditions sufficient to polymerize the matrix oligomer while in contact with the intercalated phyllosilicate and to melt the oligomer or polymer to co-intercalate the oligomer or polymer between adjacent platelets of the phyllosilicate material, wherein the intercalant oligomer or polymer is combined in an amount such that the resulting composite material contains 40% to 99.95% polymer and 0.05% to 60% intercalated phyllosilicate.

* * * * *